United States Patent [19]
Yokota et al.

[11] Patent Number: 5,975,758
[45] Date of Patent: Nov. 2, 1999

[54] METHOD AND SENSOR FOR DETECTING THERMAL HISTORY

[75] Inventors: Koji Yokota; Yoshimi Kizaki; Yoshiyuki Sakamoto; Tomoyoshi Motohiro, all of Aichi, Japan

[73] Assignee: Kabushiki Kaisha Toyota Chuo Kenkyusho, Aichi-ken, Japan

[21] Appl. No.: 08/880,690

[22] Filed: Jun. 23, 1997

[30] Foreign Application Priority Data

Jul. 16, 1996 [JP] Japan ................................ 8-206568

[51] Int. Cl.⁶ ............................ G01K 7/16; H01C 7/02; H01C 7/04
[52] U.S. Cl. ............................ 374/185; 338/25; 338/28
[58] Field of Search ............................ 374/185; 338/28, 338/25

[56] References Cited

U.S. PATENT DOCUMENTS 5,473,304  12/1995  Friese et al. ........................... 338/25
5,823,680  10/1998  Kato et al. ............................ 374/185

FOREIGN PATENT DOCUMENTS 2730764  11/1979  Germany ........................... 374/185
4300084   4/1994  Germany ........................... 374/185
6-212956  8/1994  Japan .

*Primary Examiner*—Diego Gutierrez
*Assistant Examiner*—G. Verbitsky
*Attorney, Agent, or Firm*—Oblon, Spivak, McClelland, Maier & Neustadt, P.C.

[57] ABSTRACT

Disclosed herein is a method and sensor for easily detecting the thermal history (or the change in state by heat) of a specimen. The sensor is made up of a pair of electrodes 1, 1, a diffusion layer 2 of insulating material disposed between the electrodes, and an electrically conductive metal 3. The electrodes are electrically isolated from each other in the beginning. As the sensor experiences heat history, the electrically conductive metal diffuses into the diffusion layer 2, thereby changing the resistance of the diffusion layer. When in use, the sensor is placed in or near the atmosphere to which the specimen is exposed. In response to the change of the specimen by heat, the electrically conductive metal 3 diffuses into the diffusion layer 2 to such an extent that the electrical resistance across the electrodes extremely decreases after a certain period of time. Thus it is possible to detect the deterioration or life of the specimen by monitoring the change in electrical resistance of the sensor.

17 Claims, 6 Drawing Sheets

METHOD AND SENSOR FOR DETECTING THERMAL HISTORY

BACKGROUND OF THE INVENTION

1. Field of the Invention

The present invention relates to a method and sensor for detection of thermal history which are designed to examine for the deterioration in such specimens as exhaust gas purification catalysts, and inner walls in blast furnaces, boilers and incinerators.

2. Description of the Related Art

There has been disclosed in Japanese Patent Laid-open No. 212956/1994 a method of examining the automotive exhaust gas purification catalyst for deterioration. This method consists of monitoring cerium oxide $CeO_2$ (constituting the catalyst) for its ability of oxygen storage and release by means of oxygen sensors placed at the inlet and outlet of the exhaust gas passage. The disadvantage of detection in this way is low sensitivity due to a very small change in the ability of oxygen storage and release of cerium oxide accompanied by catalyst deterioration. Another disadvantage is the necessity of using at least two oxygen sensors and comparing their outputs with reference values. Thus the above-mentioned technology needs a complex method and apparatus and is not satisfactory for the detection of catalyst deterioration.

SUMMARY OF THE INVENTION

The present invention was completed to solve the above-mentioned problems involved in the prior art technology. It is an object of the present invention to provide a method and sensor for detection of thermal history which permits one to examine the catalyst for deterioration due to temperature change in the atmosphere to which the catalyst is exposed or to predict the remaining life of the catalyst. The method and sensor may also be used to monitor such specimens as inner walls in blast furnaces, boilers, and incinerators for their thermal history due to temperature change. They may also be used to determine when the sintering of ceramic materials has completed.

In durability tests for exhaust gas purification catalysts, the present inventors found that noble metal coated on an inorganic material (as an insulator) diffuses into the inorganic material as the catalyst becomes deteriorated in the atmosphere to which the catalyst is exposed, with the result that the inorganic material (which had initially been an insulator) changed in electrical resistance. This finding led to an idea of a method and sensor for detection of thermal history which permits one to estimate the thermal history which the specimen has had, without examining the specimen directly. The present invention is based on this idea.

The first aspect of the present invention resides in a method for detecting the cumulative thermal history of a specimen over 400° C., the method comprising the steps of: placing a thermal history sensor in or near an atmosphere to which the specimen is exposed; and monitoring electrical resistance change of the thermal history sensor, the sensor comprising at least one pair of electrodes, a diffusion layer disposed between the electrodes, and an electrically conductive metal disposed on and/or in at least one of the diffusion layer and the electrodes, whereby the metal diffuses into the diffusion layer in response to temperature change in the atmosphere, and the electrical resistance changes between the electrodes electrically isolated from each other in the beginning.

The second aspect of the present invention resides in a sensor for detecting the cumulative thermal history of a specimen over 400° C., the sensor comprising: at least one pair of electrodes; a diffusion layer disposed between the electrodes; and an electrically conductive metal disposed on and/or in at least one of the diffusion layer and the electrodes, whereby the metal diffuses into the diffusion layer in response to temperature change in the atmosphere, and the electrical resistance changes between the electrodes electrically isolated from each other in the beginning.

The method and sensor for detecting thermal history according to the present invention permit one to accurately examine the specimen (particularly exhaust gas purifying catalysts) for the deterioration due to heat. Further, the sensor is simple in structure. They may be used for detection of thermal history (and deterioration thereby) experienced by the specimen such as inner walls of blast furnace, boilers, and incinerators. They may also be used to monitor when the sintering of ceramic materials completes.

The above and other objects, features, and advantages of the present invention will become more apparent from the following description when taken in conjunction with the accompanying drawings in which a preferred embodiment of the invention is shown by way of illustrative example.

DETAILED DESCRIPTION OF THE PREFERRED EMBODIMENTS

Figure 1:
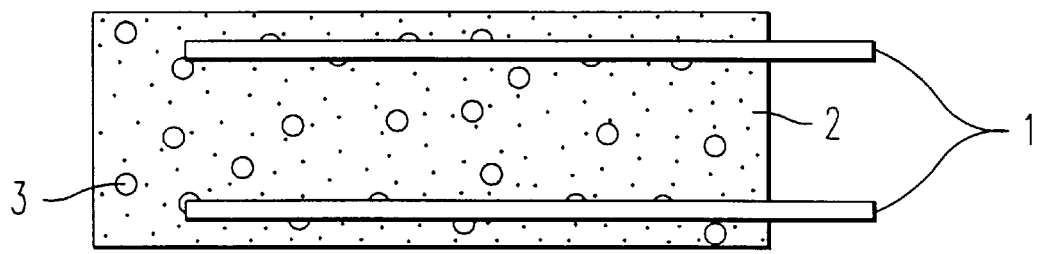
FIG. 1 is a schematic sectional view of the thermal history sensor in Example 1.

The sensor of the present invention has electrodes, which may be made of any common material, preferably those having good heat resistance, such as tungsten (W), nickel (Ni), chromium (Cr), stainless steel, and Inconel alloy, or noble metals such as platinum (Pt) and gold (Au).

The sensor also has a diffusion layer, which may be made of an electrically insulating inorganic material, preferably oxides or composite oxides of alkaline earth metals or rare earth elements. Additional examples include metal oxides, nitrides, and carbides. They should have previous pores that permit the electrically conductive metal to diffuse inside and they should not melt nor decompose at high temperatures.

The diffusion layer should preferably be made of a substance which is highly adaptive to the electrically conductive metal so that it permits the metal to readily diffuse inside irrespective of the size and shape of pores therein. In the case where a noble metal is used as the electrically conductive metal for diffusion, it is desirable to form the diffusion layer from an amphoteric or basic substance. Examples of the amphoteric substance include such metal oxides as $Al_2O_3$ and ZnO. Examples of the basic substance include alkaline earth metal oxides such as MgO and CaO, and rare earth element oxides such as $La_2O_3$. Their composite oxides may also be used. However, those substances, such as $CeO_2$, $TiO_2$ and defect perovskite, which exhibit ionic or electronic conduction at high temperature are not desirable.

The sensor has an electrically conductive metal which is selected from platinum, gold, palladium, rhodium, ruthenium, nickel, chromium, copper, etc. according to the atmosphere to which the sensor is exposed. A noble metal is desirable which neither reacts with the electrodes, insulation layer, and insulating material nor evaporates. of noble metals, platinum and gold are desirable which hardly form oxides. Since they differ in melting point, they diffuse into the diffusion layer at different rates depending on temperature. For use in an atmosphere lower than 900° C., gold is adequate, and for use in an atmosphere higher than 900° C., platinum is recommended. Even in the former case, slow-diffusing platinum may be desirable if it is necessary to detect thermal history over a long period of time.

It is desirable to cover the sensor or at least one member of the constituents (i.e., electrodes, diffusion layer, and electrically conductive metal) of the sensor (specifically the portion which is exposed to an atmosphere) with an impervious material, such as stainless steel and ceramics. This covering prevents the sensor from deterioration due to any causes other than heat.

The impervious material may also function as the electrode.

The electrically conductive metal diffuses and condenses very fast above a temperature which is half its melting point. Therefore, the sensor of the present invention is suitable for use in an atmosphere which is higher than 400° C., preferably higher than 500° C. It is possible to select adequate constituent materials according to the atmosphere in which the sensor is used.

It is thermal history in excess of 400° C. which is integrated by the sensor of the present invention.

The following is a description of the method for detection of thermal history, the function of the thermal history sensor, and the method of using the sensor.

Any substance at a high temperature undergoes either discontinuous, abrupt change (such as melting and evaporation) or continuous, mild change (such as condensation). The latter change proceeds at a rate defined by Arrhenius equation. In other words, any specimen exposed to a high-temperature atmosphere has a life which is expressed as follows.

$$t_{max} = A \cdot exp(B/T)$$

where $t_{max}$ is the life of the specimen exposed to the high-temperature atmosphere, T is the temperature of the atmosphere, and A and B are constants inherent in the specimen. The equation above permits one to easily predict the life of the specimen if the atmosphere remains at a constant temperature. However, the equation would be complex for a specimen (such as the automotive exhaust gas purification catalyst) exposed to the atmosphere which continually changes in temperature. In such a case, it is not easy to predict the life of the specimen.

The present invention is intended to solve this problem. The present inventors conceived an idea of the sensor whose life is equal to the time which the specimen would take to deteriorate. The function of the sensor is as follows.

The sensor is placed in or near the atmosphere to which the specimen is exposed. With the elapse of time, the electrically conductive metal constituting the sensor irreversibly diffuses into the diffusion layer at a rate proportional to the temperature of the atmosphere to which the sensor is exposed. This changes the sensor in electrical resistance or conductivity. The present inventors found that this change abruptly occurs within a certain elapsed time. Thus this change can be easily detected and hence the deterioration of the specimen can be easily detected. In addition, the diffusion by heating is irreversible and integratable. In other words, it adds up the history of deterioration.

If the sensor is to be used to detect whether the life of the exhaust gas purification catalyst has ended due to deterioration by heat, the sensor is designed such that it becomes electrically conductive (as the result of diffusion of the electrically conductive metal into the diffusion layer) at the time when the life of the catalyst ends. In other words, the life of the catalyst can be detected by measuring the time required for the sensor to become electrically conductive. There is another usage of the sensor. It will be possible to monitor sequentially the state of deterioration of the specimen if a plurality of sensors differing in characteristic properties are connected in parallel or series or if a plurality of sensors of the same characteristic properties are placed in various atmospheres.

Figure 10:
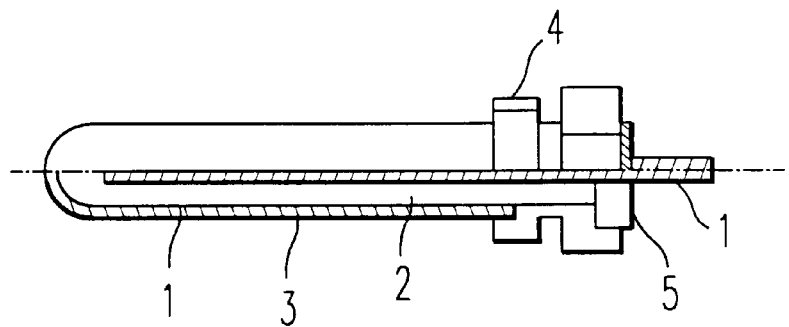
FIG. 10 is a schematic diagram showing the thermal history sensor in Example 4.

The following is a description of the structure of the sensor of the present invention. FIG. 10 schematically shows the structure of the sensor of cylindrical type. There is shown a first electrode 1 at the center of the cylinder. A diffusion layer 2 is formed around the first electrode 1. The first electrode 1 and the diffusion layer 2 are accommodated in a second electrode 1 which functions as a container made of an impervious material. On the surface of the second electrode 1, an electrically conductive metal 3 is formed which is capable of diffusion into the second electrode 1 and the diffusion layer 2. The electrically conductive metal 3 may be in the form of thin film formed by plating entirely or partly on the surface of the second electrode 1. (Partial plating is intended to modify the characteristic properties of the sensor.)

If the sensor constructed as mentioned above is to be used to detect the deterioration of the exhaust gas purification catalyst, the sensor is fastened by means of the screw 4 to a predetermined portion inside the container of the exhaust gas purification apparatus. The first electrode 1 is connected to a circuit (not shown) to detect the electrical conductivity and/or resistance, so as to monitor the change in conductivity and/or resistance that occurs according as the electrically conductive metal 3 diffuses into the diffusion layer 2. The detection of this change enables one to detect the deterioration and/or life of the specimen (or the exhaust gas purification catalyst). In the following description, same reference numerals designate same or corresponding parts.

Figure 2:
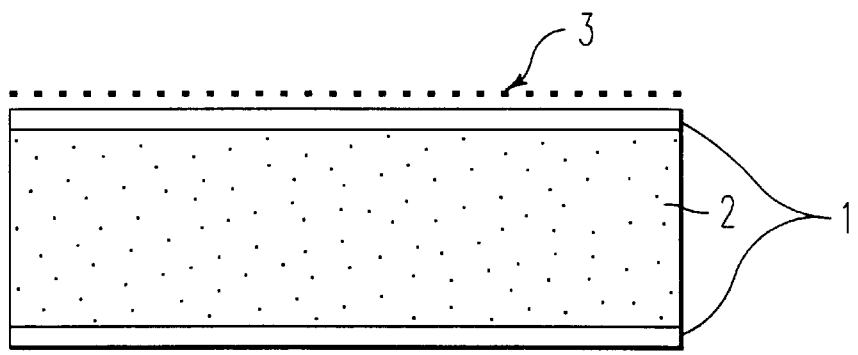
FIG. 2 is a schematic sectional view of a typical example of the thermal history sensor pertaining to the present invention.

FIG. 2 schematically shows the cross-section of the sensor which has sandwich structure, with the diffusion layer 2 sandwiched between the paired electrodes 1, 1. In other words, it consists of a diffusion layer 2, a pair of flat electrodes 1, 1 (sandwiching the diffusion layer 2 between them), and an electrically conductive metal 3 formed on one of the electrodes 1. The sensor constructed as mentioned above is placed in or near the atmosphere to which the specimen is exposed. As in the case of the sensor of cylindrical structure, the change in electrical conductivity and/or resistance that occurs according as the electrically conductive metal 3 diffuses into the diffusion layer 2 is monitored so as to detect the deterioration and/or the life of the specimen.

Figure 3:
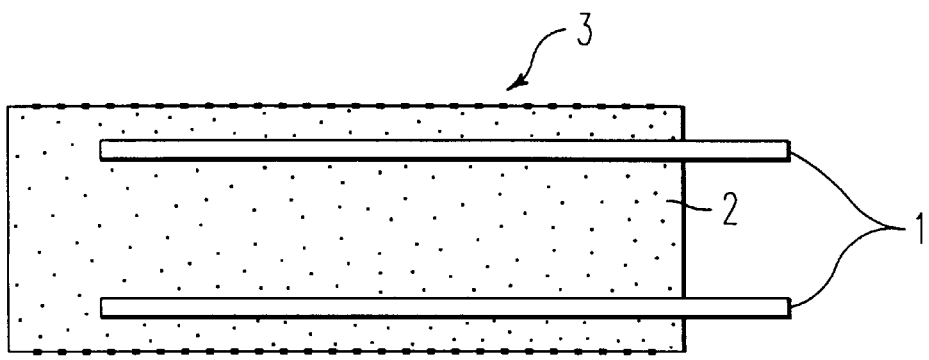
FIG. 3 is a schematic sectional view of the thermal history sensor in Example 2.

FIG. 3 schematically shows the cross-section of the sensor consisting of paired wire-like electrodes 1, 1, a diffusion layer 2, and an electrically conductive metal 3, the electrodes being embedded in the diffusion layer, and the metal being coated on the upper and lower sides of the diffusion layer.

FIG. 1 schematically shows the cross-section of the sensor consisting of paired wire-like electrodes 1, 1, a diffusion layer 2, and electrically conductive metals 3, the electrodes being embedded in the diffusion layer, and the metals being distributed throughout the diffusion layer.

In the sensors of the above-mentioned four structures, the electrodes may also function as the electrically conductive metal. Further, the sensors may have any suitable shapes to the specimen. (e.g. discoid, polygon, or cylinder)

The above-mentioned four structures are illustrative only, and they are not intended to restrict the sensor of the present invention.

EXAMPLES

To further illustrate the invention, and not by way of limitation, the following examples are given.

(Example 1)

A mixture was prepared from 8 g of MgO powder and 1 g of platinum black (both having average particle diameter of about 5 $\mu$m). The mixture underwent press-molding, with two platinum wires as electrodes (1 mm in diameter) embedded parallel therein. The molding was sintered at 400° C. for 1 hour. Thus there was obtained a discoid sensor, whose section is schematically shown in FIG. 1. This sensor is composed of a pair of platinum electrodes 1, 1, diffusion layer 2 formed of MgO, and platinum as the electrically conductive metal 3, with the platinum being distributed through the diffusion layer and the electrodes being embedded parallel in the diffusion layer. In this example, three kinds of sensors were prepared, with the electrodes differing in their space (1.1 mm, 1.8 mm, and 2.6 mm).

Figure 4:
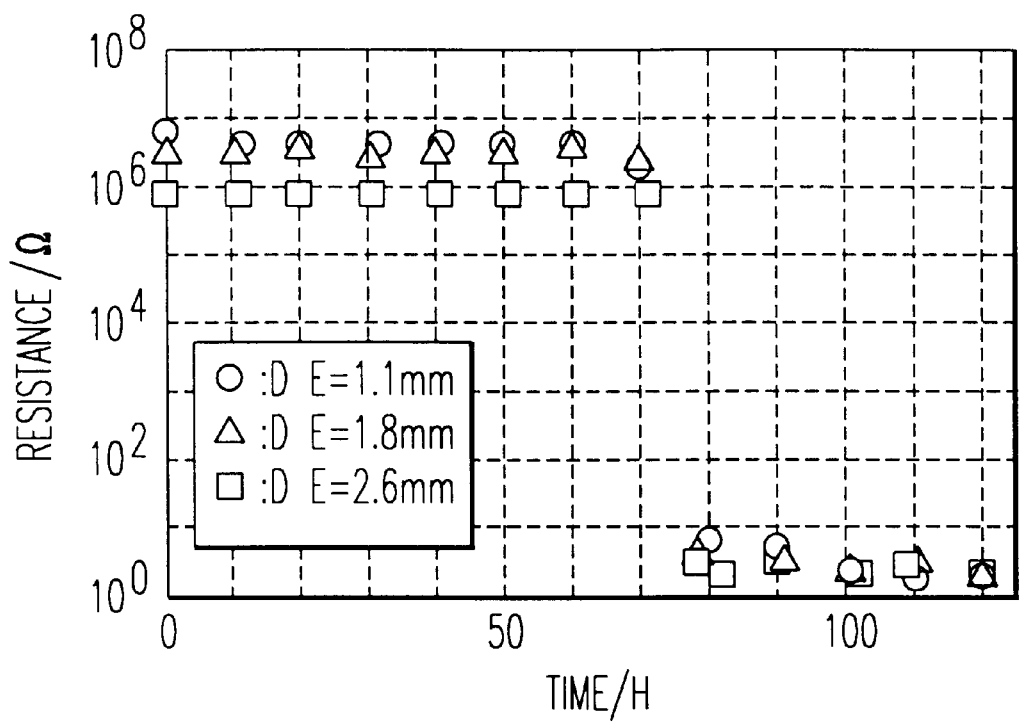
FIG. 4 is a graph showing how the sensor in Example 1 changes in electrical resistance with time when heated.

The thus obtained sensor was held in an electric furnace which kept the atmosphere therein at 700° C. The change with time in electrical resistance across the electrodes was recorded. The results are shown in FIG. 4, with the elapsed time as abscissa and the electrical resistance as ordinate. It is noted that the resistance suddenly decreases after the lapse of about 75 hours irrespective of the electrode spacing. (This phenomenon is termed as "connection". "Connection" does not necessarily mean that the resistance is zero but means that the resistance has decreased suddenly or slowly to a predetermined smaller value compared with the initial value.

The phenomenon in contrast with "connection" is termed as "disconnection". "Disconnection" does not necessarily means that the resistance is infinity but means that the resistance is greater relative to the predetermined small value.)

The above-mentioned results suggest that it would be possible to detect the deterioration or the life of the specimen without measuring the specimen directly if the sensor is placed in an atmosphere in which the specimen would deteriorate after 75 hours at the specified temperature and the resistance of the sensor is monitored. The results in this example also suggest that the time required for "connection" to take place hardly depends on the electrode spacing.

The sensor, with its resistance decreased to the predetermined value, was decomposed and the diffusion layer was examined by means of a scanning electron microscope. It was found that the MgO particles were coated with platinum. This suggests that the platinum which was initially distributed through the MgO diffusion layer migrated (by diffusion) to the surface of MgO particles with the lapse of time, with the result that the electrical resistance suddenly fell after 75 hours.

A probable reason for the insensitive dependence of the time to "connection" on the electrode spacing is that platinum particles (as the electrically conductive metal) are previously distributed through the diffusion layer such that the distance between them is much smaller compared with the electrode spacing and hence the platinum particles connect to one another to conduct electricity irrespective of the electrode spacing. This suggests that it would be possible to change the characteristic properties of the sensor by changing the distance of diffusion.

(Example 2)

Samples of sensors were prepared in the same manner as in Example 1 except that platinum black (as the electrically conductive metal 3) was not incorporated into the diffusion layer 2 of MgO but platinum was deposited on both sides of the flat diffusion layer 2 of MgO. The sensor has a pair of wire-like platinum electrodes 1, 1 embedded parallel 2.6 mm apart from each other in the diffusion layer 2 of MgO. It also has platinum layers deposited on both sides of the flat diffusion layer 2. FIG. 3 schematically shows in section the sensor in this example. The samples vary in the thickness of the flat diffusion layer (5 mm, 7 mm, and 10 mm).

Figure 5:
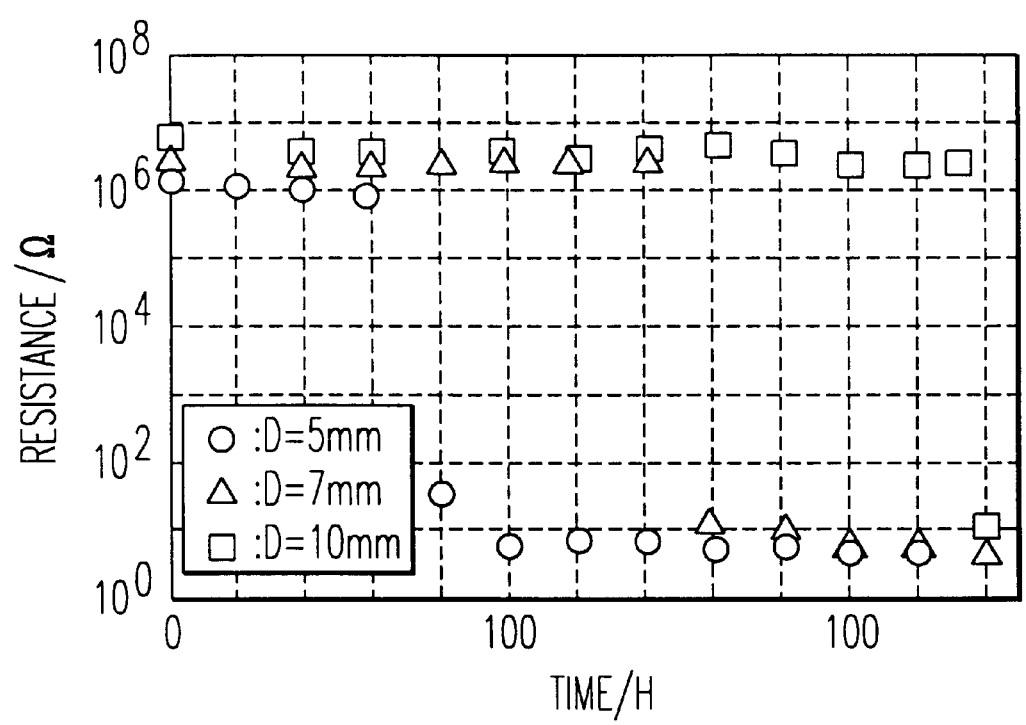
FIG. 5 is a graph showing how the sensor in Example 2 changes in electrical resistance with time when heated.

The thus obtained sensors were kept at 700° C. and measured for change in electrical resistance with time across the electrodes in the same manner as in Example 1. The results are shown in FIG. 5. It is noted that the thinner the diffusion layer, the shorter the time required for the electrical resistance to fall suddenly.

Figure 6:
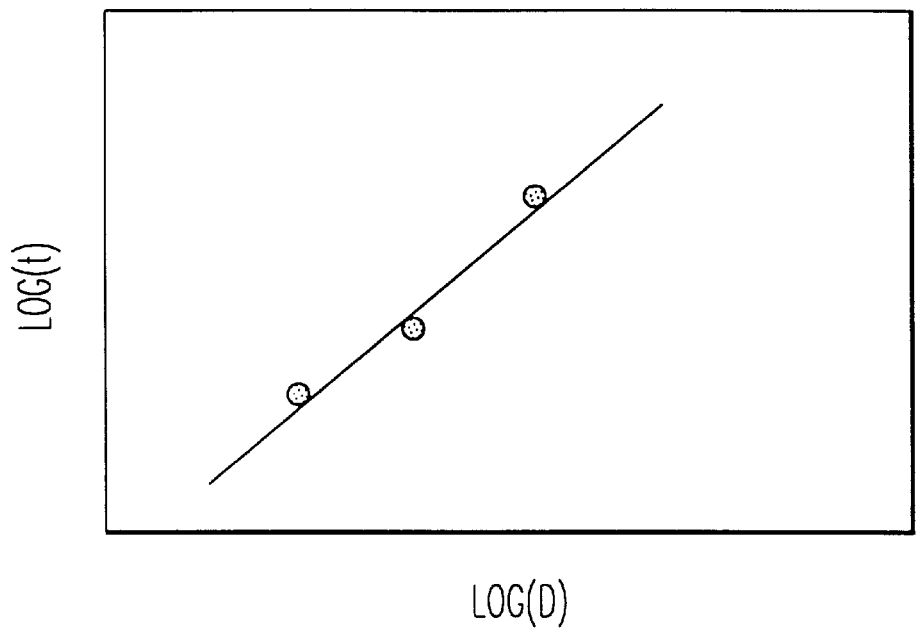
FIG. 6 is a logarithmic graph showing how the thickness (D) of the diffusion layer of the sensor in Example 2 affects the time (t) required for the diffusion layer to become electrically conductive due to heating.

FIG. 6 shows the relation between the time(T) required for the electrical resistance to fall suddenly and the thickness (D) of the diffusion layer in the three samples of the sensors. The abscissa and ordinate respectively show the thickness (log(D)) and the time(log(t)). It is noted that log(D) is approximately proportional to log(t). This suggests that it is possible to control the characteristic properties of the sensor (or the time to "connection") by changing the thickness of the diffusion layer, and hence it is possible to prepare the sensor according to the condition in which the specimen is used.

Figure 7:
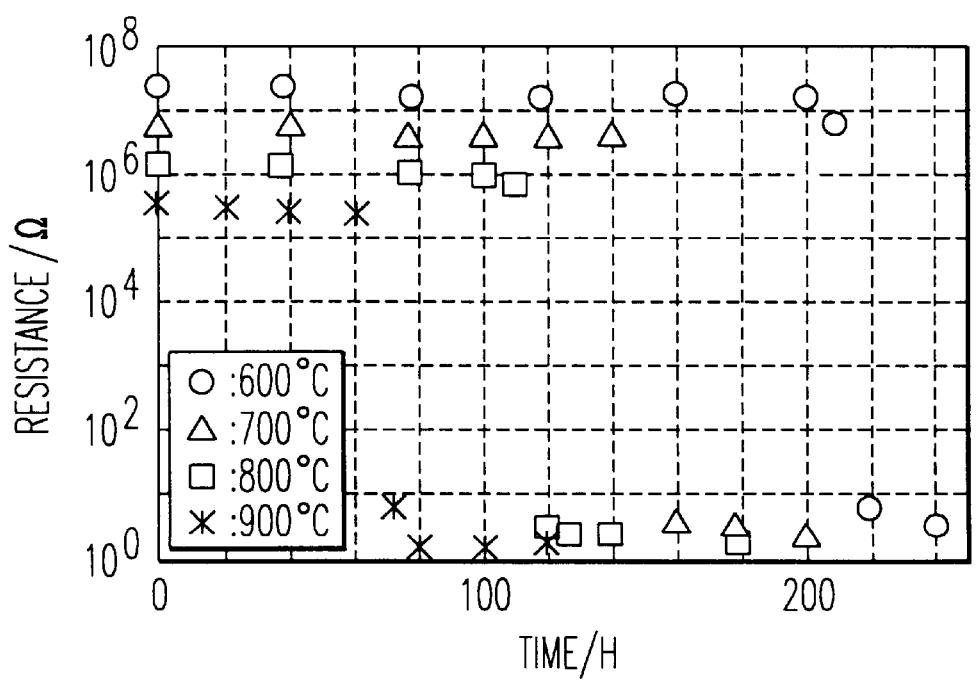
FIG. 7 is a graph showing how the sensor in Example 2 changes in electrical resistance with time when the atmosphere to which the sensor is exposed changes in temperature.

Samples of the sensor in which the diffusion layer is 7 mm thick were exposed to atmospheres at varying temperatures of 600° C., 700° C., 800° C., and 900° C. The relation between the duration of exposure to the atmosphere and the change in electrical resistance was investigated. The results are shown in FIG. 7. It is noted that the higher the atmosphere temperature, the shorter the time required for electrical resistance to fall suddenly.

Figure 8:
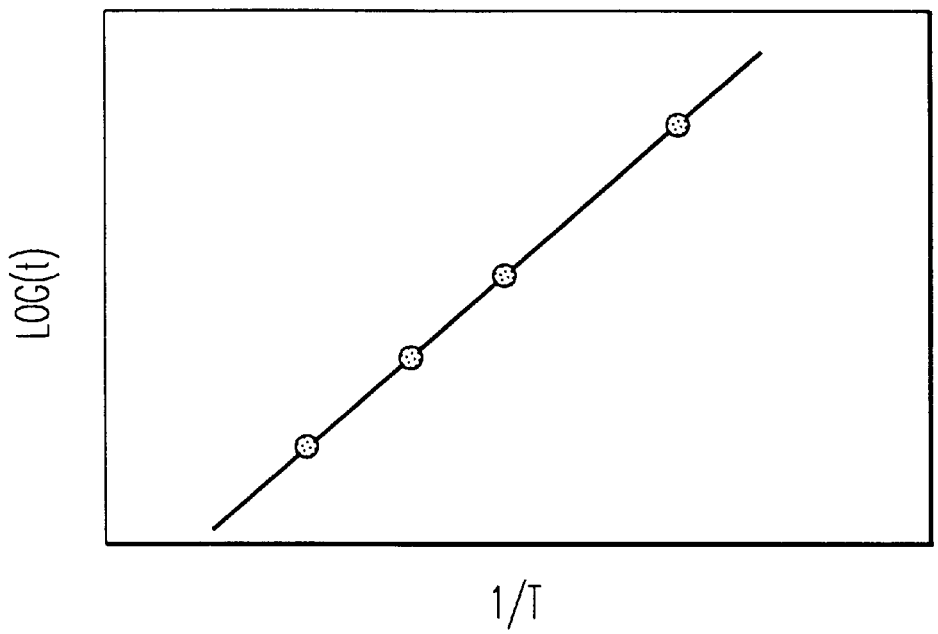
FIG. 8 is a logarithmic graph showing how the temperature (1/T) of the atmosphere to which the sensor in Example 2 is exposed affects the time (t) required for the diffusion layer to become electrically conductive due to heating.

FIG. 8 shows the relation between the time (t) required for electrical resistance to fall suddenly and the temperature (T) of the atmosphere. The abscissa represents the temperature (1/T) and the ordinate represents the time (log(t)). It is noted that 1/T is approximately proportional to log(t). This suggests that it is possible to predict the time required for electrical resistance to fall suddenly from the temperature of the atmosphere.

FIG. 8 enables one to predict the time required for electrical resistance to fall suddenly when the sensor is exposed to an atmosphere at a certain temperature, and FIG. 6 enables one to determine the thickness of the diffusion layer of the sensor from the predicted time. This means that it is possible to produce a thermal history sensor that simulates the deterioration by heat in an atmosphere to which the specimen is exposed.

If the correlation between the time to connection and the life of the specimen is obtained in advance based on the above-mentioned relationship, the life of the specimen can be judged from the fact that the sensor installed in an atmosphere to which the specimen is exposed reaches the state of "connection" during the use of the specimen in the atmosphere. The correspondence between the time until connection and the life of the specimen holds when the temperature of the atmosphere is either constant or varied. This results from the fact that the electrically conductive metal diffuses into the diffusion layer irreversibly on heating. In other words, the diffusion takes place in an accumulating manner.

(Example 3)

Figure 9:
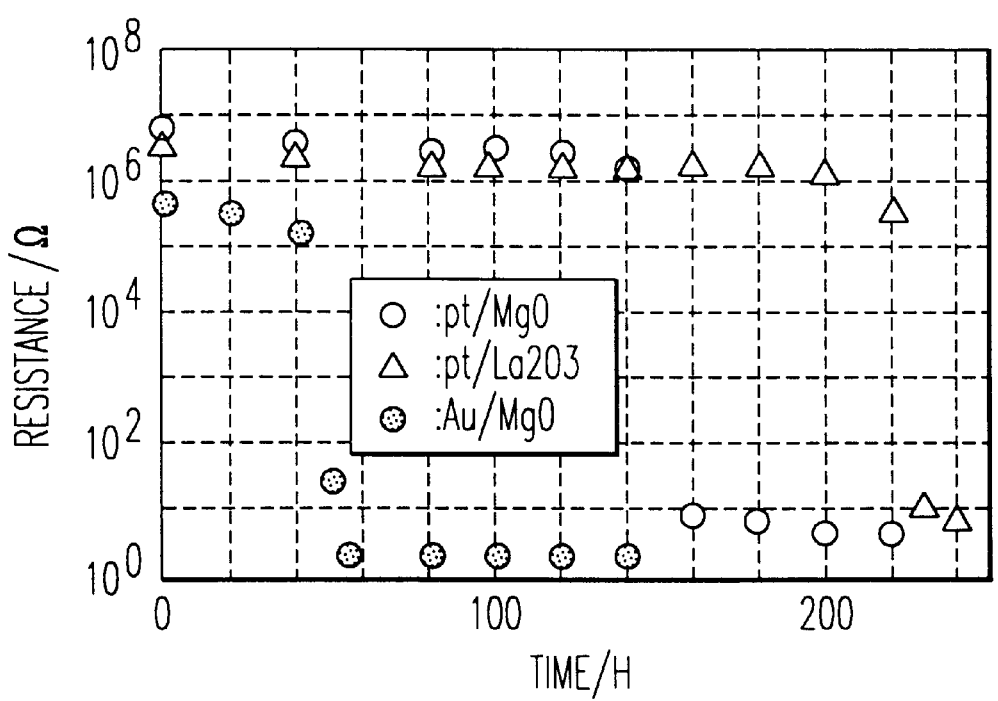
FIG. 9 is a graph showing how the sensor in Example 3 changes in electrical resistance with time when heated.

A sensor was prepared in the same manner as in Example 2 except that MgO for the diffusion layer was replaced by $La_2O_3$. (This sensor is designated as $Pt/La_2O_3$.) Another sensor was prepared in the same manner as in Example 2 except that platinum for the electrically conductive metal was replaced by gold. (This sensor is designated as Au/MgO.) These sensors were held in an atmosphere at 700° C. and the each change in electrical resistance with time across the electrodes was measured in the same manner as in Example 2. The results are shown in FIG. 9 together with the results of the sensor in Example 2. It is noted that each sensor ($Pt/La_2O_3$ and Au/MgO) showed a rapid decrease in resistance at a certain time. This suggests that it is possible to control the time for connection by changing the kind of the electrically conductive metal or the diffusion layer.

(Example 4)

A sensor of cylindrical type as shown in FIG. 10 was prepared. This sensor consists of a first electrode 1 of platinum (at the center of the cylinder), a diffusion layer 2 of MgO enclosing the first electrode 1, and a second electrode 1 of Inconel alloy (in cylindrical form) which functions as a container for the first electrode 1 and diffusion layer 2. The two electrodes are electrically insulated from each other by an insulator 5 which also serves to fix the first electrode at the center of the cylinder. The second electrode 1 has its surface plated with platinum as an electrically conductive metal 3 which diffuses into the diffusion layer 2 and the second electrode 1. This sensor is about 50 mm long and about 8 mm in diameter. This sensor is designed such that platinum (as the electrically conductive metal) infiltrates into Inconel while forming an alloy and then diffuses into the diffusion layer. In other words, the sensor in this example needs two steps before the abrupt falling of electrical resistance; however, it works in the same manner as the sensors mentioned above.

Figure 11:
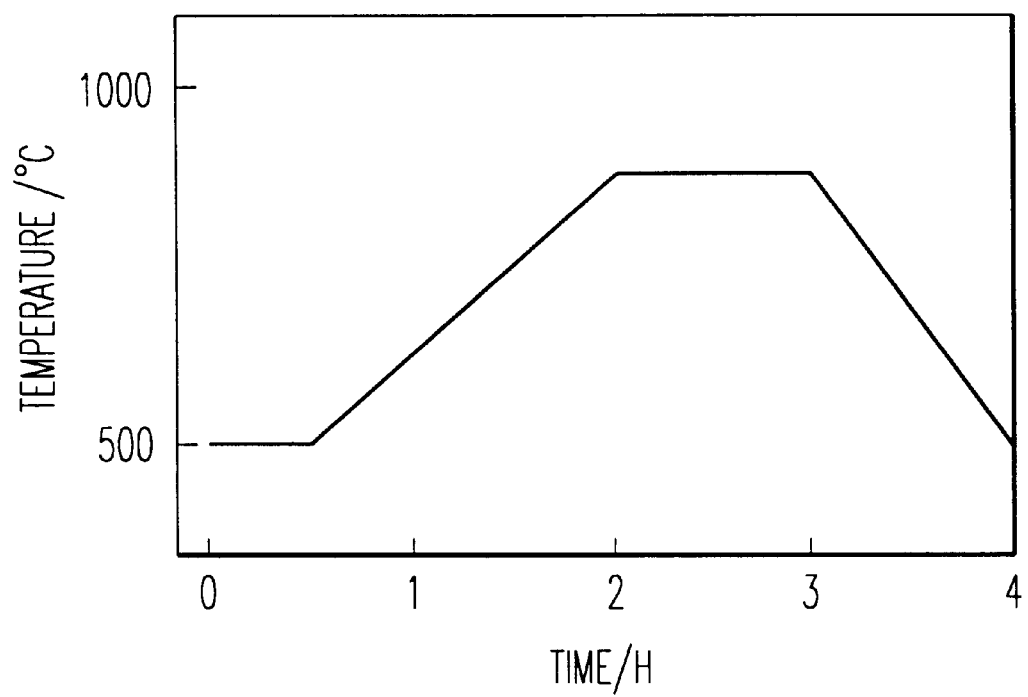
FIG. 11 is a graph showing the temperature-time relation in durability test for the sensor in Example 4.
Figure 12:
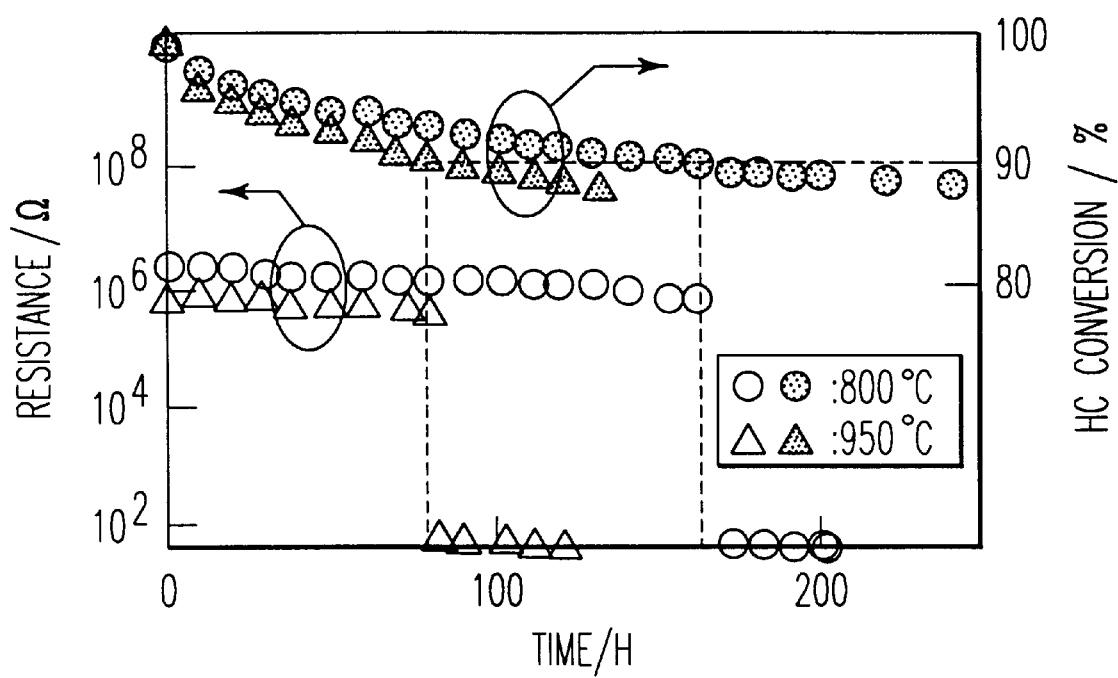
FIG. 12 is a graph showing the resistance of the sensor in Example 4 (at different temperatures) as the function of time, the HC conversion ratio of the exhaust gas purifying catalyst used in Example 4 as the function of time, and the HC conversion ratio as the function of time required for the sensor to become electrically conductive.

To measure its characteristic properties, the sensor was placed in an atmosphere whose temperature was changed according to the pattern shown in FIG. 11 and was tested for its durability on heating. The pattern is such that the temperature is kept at 500° C. for 0.5 hour and then raised to the maximum temperature of 800° C. or 950° C. over 1.5 hours and the maximum temperature is held for about 1 hour and finally the temperature is lowered to about 500° C. over about 1 hour. One cycle of the pattern takes 4 hours. The atmosphere is composed of 1% propane and 10% oxygen, with the remainder being nitrogen. The results are shown in FIG. 12. The test with the maximum temperature of 800° C. is indicated by circles, and the test with the maximum temperature of 950° C. is indicated by triangles. The abscissa represents the time, and the ordinate represents the resistance of the sensor. It is noted that if the maximum temperature is 800° C., the resistance of the sensor abruptly decreases after about 170 hours. It is also noted that if the maximum temperature is 950° C., the resistance of the sensor abruptly decreases after about 80 hours.

A three-way catalyst for exhaust gas purification was prepared which consists of a cordierite substrate (in honeycomb structure, 100 mm long and 80 mm in diameter) coated with $\gamma$-$Al_2O_3$ (100 g/L) and supporting platinum (1 g/L). This catalyst was accommodated in an stainless steel container provided with an exhaust gas inlet and outlet pipes. A model gas composed of 1 vol % propane as hydrocarbon HC and 10 vol % oxygen, with the remainder being nitrogen, was fed to the container at a space velocity of 15000/h. During the durability test, the temperature of the inlet gas was changed according to the pattern shown in FIG. 11.

The results of the test are shown in FIG. 12. The abscissa represents the time, and the ordinate represents the conversion ratio of propane (as the hydrocarbon HC). The test with the maximum temperature of 800° C. is indicated by solid circles, and the test with the maximum temperature of 950° C. is indicated by solid triangles. It is noted that the conversion ratio gradually decreases with time. A decrease to about 90% takes about 170 hours and 80 hours, respectively, when the maximum temperature is 800° C. and 950° C. These time periods correspond to the time required for the resistance of the sensor to decrease abruptly. This suggests that it is possible to detect the life of the specimen by monitoring the resistance of the sensor placed in an atmosphere to which the specimen is exposed. Thus the sensor in this example can be used to monitor the deterioration of the catalyst.

What is claimed is:

1. A method for detecting a cumulative thermal history of a specimen over 400° C., said method comprising providing a thermal history sensor comprising at least one pair of electrodes, a diffusion layer disposed between said electrodes, and an electrically conductive metal in contact with at least one of said diffusion layer and said electrodes, wherein no connected metal path exists across said diffusion layer between said electrodes;

placing said thermal history sensor in or near an atmosphere to which the specimen is exposed; and monitoring an electrical resistance of said thermal history sensor.

2. A method for detecting thermal history as defined in claim 1, wherein the diffusion layer is made of an electrically insulating inorganic material.

3. A method for detecting thermal history as defined in claim 2, wherein the inorganic material is an oxide or composite oxide of at least one selected from the group consisting of alkaline earth metals and rare earth elements.

4. A method for detecting thermal history as defined in claim 1, wherein the electrically conductive metal is a noble metal.

5. A method for detecting thermal history as defined in claim 1, wherein the specimen is an exhaust gas purification catalyst.

6. A method according to claim 1, wherein said metal is distributed throughout said diffusion layer.

7. A method according to claim 1, wherein said metal is formed on at least one electrode of said electrodes.

8. A method according to claim 1, wherein said electrodes are embedded in said diffusion layer and said metal coats at least one of an upper side and a lower side of said diffusion layer.

9. A method according to claim 1, further comprising forming a connected metal path across said diffusion layer between said electrodes after the specimen has been heated to a temperature over 400° C.

10. A sensor for detecting a cumulative thermal history of a specimen over 400° C., said sensor comprising at least one pair of electrodes;

a diffusion layer disposed between said electrodes; and an electrically conductive metal in contact with at least one of said diffusion layer and said electrodes, wherein no connected metal path exists across said diffusion layer between said electrodes.

11. A sensor for detecting thermal history as defined in claim 10, wherein the diffusion layer is made of an electrically insulating inorganic material.

12. A sensor for detecting thermal history as defined in claim 11, wherein the inorganic material is an oxide or composite oxide of at least one selected from the group consisting of alkaline earth metals and rare earth elements.

13. A sensor for detecting thermal history as defined in claim 10, wherein the electrically conductive metal is a noble metal.

14. A method of using a sensor for detecting thermal history, the method comprising using the sensor of claim 10 to detect the thermal history of an exhaust gas purification catalyst.

15. A sensor according to claim 10, wherein said metal is distributed throughout said diffusion layer.

16. A sensor according to claim 10, wherein said metal is formed on at least one electrode of said electrodes.

17. A sensor according to claim 10, wherein said electrodes are embedded in said diffusion layer and said metal coats at least one of an upper side and a lower side of said diffusion layer.

* * * * *